United States Patent [19]

Payne

[11] Patent Number: 4,599,963
[45] Date of Patent: Jul. 15, 1986

[54] BOAT CONSTRUCTION

[76] Inventor: David E. Payne, Villa 133, Captain John Fripp's Villas, Fripp Island (Beaufort), S.C. 29901

[21] Appl. No.: 647,417

[22] Filed: Sep. 5, 1984

Related U.S. Application Data

[63] Continuation-in-part of Ser. No. 356,371, Mar. 9, 1982, abandoned, and a continuation-in-part of Ser. No. 578,565, Feb. 9, 1984, Pat. No. 4,572,096.

[51] Int. Cl.$^4$ .............................................. B63B 3/00
[52] U.S. Cl. ........................................ 114/88; 52/282; 52/482; 52/766; 114/356
[58] Field of Search ........................ 114/356, 88, 79 R; 52/766, 482, 282; 403/217, 218, 205, 403

[56] References Cited

U.S. PATENT DOCUMENTS 3,190,408  6/1965  Petterson ........................ 114/88 X
3,214,888  11/1965  Ridder ............................. 114/88 X
3,429,088  2/1969  Katzman ........................ 114/356 X

FOREIGN PATENT DOCUMENTS 2073308  10/1981  United Kingdom ................ 403/217

Primary Examiner—Sherman D. Basinger
Attorney, Agent, or Firm—Jay L. Chaskin

[57] ABSTRACT

Sheets of a vessel or other construction are joined edge to edge by deforming an edge of each sheet to have a projection from one face of the sheet, the deformed edge is entered into a slot of a joining strip and the outstanding projections are moved across in the slot so that they engage against an abutment extending into the slot from a surface of the strip. Another surface of the strip has teeth extending into the slot. A key, having teeth complementary to the slot teeth, is inserted into the slot to bear against the other face of the sheet and thereby maintain the engagement of the projections with the abutment. The ends of the joining strips are then clamped with such pressure that sliding of the sheet edge within the slot is inhibited and the slot is prevented from opening by clamping forces exerted by and within the assembled structure.

47 Claims, 11 Drawing Figures

BOAT CONSTRUCTION

CROSS-REFERENCE TO RELATED APPLICATIONS

This application is a continuation-in-part of application Ser. No. 356,371, filed Mar, 9, 1982, now abandoned, and a continuation-in-part of application Ser. No. 578,565, filed Feb. 9, 1984 now U.S. Pat. No. 4,572,096.

BACKGROUND OF THE INVENTION

This invention relates to improvements in the construction of a vessel, in particular a boat, wherein use is made of metal sheets.

Metal boats are usually constructed by a process of forming metal sheets, for example, two sheets side by side for the water panels joined at their front ends to a stem and along their lower edges to the underwater panels, and a sheet for the transom. The sheets are welded, where they join one another, frequently to extrusions of metal, and this welding operation is one of the most expensive operations in the construction of a boat hull. The most commonly used metal in such construction is marine grade aluminum, and this suffers with the phenomenon of a heat affected zone near the weld zone which is subject to cracking under fatigue loading. The invention herein is directed to improvements whereby the welding can be reduced or eliminated, and although the invention can, with necessary changes, be applied to a boat having sheets of steel, it is described hereunder with reference to a boat having aluminum sheets.

U.S. Pat. No. 3,190,409 describes a construction using a wedge shaped band forced between a plate and a leg of a slot. This arrangement does not provide a positive interlock between the plate and a joining strip, and experimental work by the applicant herein has established that an interlock is very desirable. U.S. Pat. No. 3,190,408 and applicant's Australian Patent Application No. PE7933, filed Mar. 10, 1981, describe further structures wherein sheets are joined by deforming an edge of each sheet to have an outstanding projection which entered into a slot of a joining strip and moved across in that slot to engage behind an abutment existing in the wall of the slot, and a key inserted to maintain engagement.

Experimental work conducted by the applicant herein has indicated that excellent results can be achieved with such a construction. However, the safety requirements for boats is such that a higher degree of integrity must be achieved.

It is an object of this invention to provide an improvement in the construction of boats which has a high degree of integrity.

It is an object of this invention to provide an improvement in a method for the construction of boats which has a high degree of integrity.

It is a further object of the present invention to provide a method and means for carrying out the method by which a boat can be constructed which has a high degree of intergrity.

It will be appreciated that with any vessel, particularly with a boat, the most vulnerable point of a hull is the corner between adjacent panels inclined at an angle to one another. The corner is the point most likely to encounter impact and impact to one panel can be transmitted to other panels through that point.

There are several situations which are frequently encountered in practice. Firstly, if a sheet of metal forming a panel of a boat is subjected to impact between its ends, there will be a sliding of the sheet edge within its joining strip which will cause shearing of the sealant between the surfaces and allow the boat to leak. The large mechanical advantage which exists to cause such sliding can cause movement of the end of the sheet away from the end of its joining strip. It is therefore been found desirable to provide means which will inhibit such sliding motion as much as possible.

Secondly, if the corner between joining strips is subjected to impact, the resulting deformation of the channel walls is usually a spreading apart of those walls at that location. This also has the effect of separating the contiguous surfaces with the failure of the sealant therebetween. Once the joint fails at its end, progressive failure along the length of the joint could occur quite easily and this of course constitutes a serious hazard for leaking of water into the boat.

BRIEF SUMMARY OF THE INVENTION

This invention relates to a method of construction of a vessel, using sheets and joining strips, each joining strip being of a defined cross-sectional shape and having a slot containing abutments. Each sheet is deformed near one edge thereof to have a retaining surface projecting from one face, the retaining edge being retained in engagement with one of the abutments by inserting a key to bear against the other face of the sheet, the retaining key also being retained by engaging another abutment. The invention is particularly characterized by clamping blocks which clamp the ends of the joining strip over the sheet.

In accordance with the method a shaped joining strip is produced having first and second facing surfaces defining a slot therebetween. The first surface has a tooth formation and the second surface has an abutment including an angled surface. A sheet of material is deformed near one edge thereof to provide a retaining surface projecting from one face of the sheet. The deformed edge of the sheet is inserted into the slot and the retaining surface is located adjacent the angled abutment surface. A key is provided having a tooth formation on one surface. The key is inserted into the slot to locate the tooth formation of the key and the strip in engaging relationship and also to bear against the other face of the sheet thereby providing engagement of the projection retaining surface and the abutment surface. The ends of the strip and portions of the sheet adjacent those ends are clamped with respective pairs of clamps. One clamp of each pair of clamps is urged into surface-to-surface engagement with inner surfaces of the strip and the sheet and the other of each pair of clamps is urged into surface-to-surface engagement with outer surfaces of the strip and the sheet so as to thereby firmly close and clamp the strip ends against the sheet and the key.

In accordance with the disclosed construction of a vessel a boat is provided having at least one joining strip having a pair of first and second flanges defining a slot therebetween. The first flange has a tooth formation extending into the slot and the second flange has an abutment including an angled surface extending into the slot. Each sheet of forming the panels of the boat has a retaining surface projecting from one face of the sheet.

The projecting surface is disposed in the slot such that the retaining surface bears against the abutment. A key is located in the slot, the key having a tooth formation complementary to and engaging the tooth formation of the first flange.

In accordance with the disclosed invention an article of manufacture is provided comprising a strip having first and second surfaces defining a slot therebetween, the first surface having a tooth formation extending into the slot. The second surface has an abutment including an angled surface extending into the slot.

In accordance with the disclosed invention an article of manufacture is provided comprising a strip having a tooth formation on one surface and a recess on a surface opposite to the tooth surface.

In some embodiments of the invention, sealing is achieved by the introduction of a sealant into the slot or slots of the vessel or in the space formed by the inner and outer clamps or where each of the abutments confronts a face of the sheet.

In accordance with this invention it is possible in some instances to construct a vessel while completely avoiding welding, and in other instances reducing welding to a minimum, thereby reducing costs and at the same time reducing danger of damage to the aluminum temper which can otherwise be imparted by the welding operation. The sealing can be mechanical, for example, by distortion of portion of the strip at the location of the seal or it can be with a mastic deformable material, preferably a flexible resin based glue or silicone rubber or a resilient elastomeric strip or a urethane.

The vessel constructed by the method of this invention will have a strong interlock between the sheets, supplemented by a very firm clamping of the joining strip which greatly increases the integrity of the joint at the most vulnerable location.

The applicant herein has established by distortion tests that properly constructed vessels utilizing the method and means of the present invention have a very high factor of safety, and that embrittlement zones can be almost or entirely eliminated.

If the clamping blocks are so arranged that the inner block of any pair of blocks is very rigid, the outer block less rigid than the inner block, but still more rigid than the joining strip, clamping of the blocks together will cause firm clamping of the sheet edge within the slot of the joining strip and subsequent deformation of the outer block with only a small degree of deformation of the inner block. The blocks can be arranged that when so clamped, the facing surfaces of the inner and outer blocks are complementary to the contiguous surfaces of the sheet and joining strip, so that the blocks clamp the joining strips to their sheet edges as well as clamping the sheets themselves.

BRIEF DESCRIPTION OF THE DRAWINGS

An embodiment of the invention is described hereunder in some detail with reference to and are illustrated in the accompanying drawings, in which.

DETAILED DESCRIPTION OF THE PREFERRED EMBODIMENTS

Figure 1:
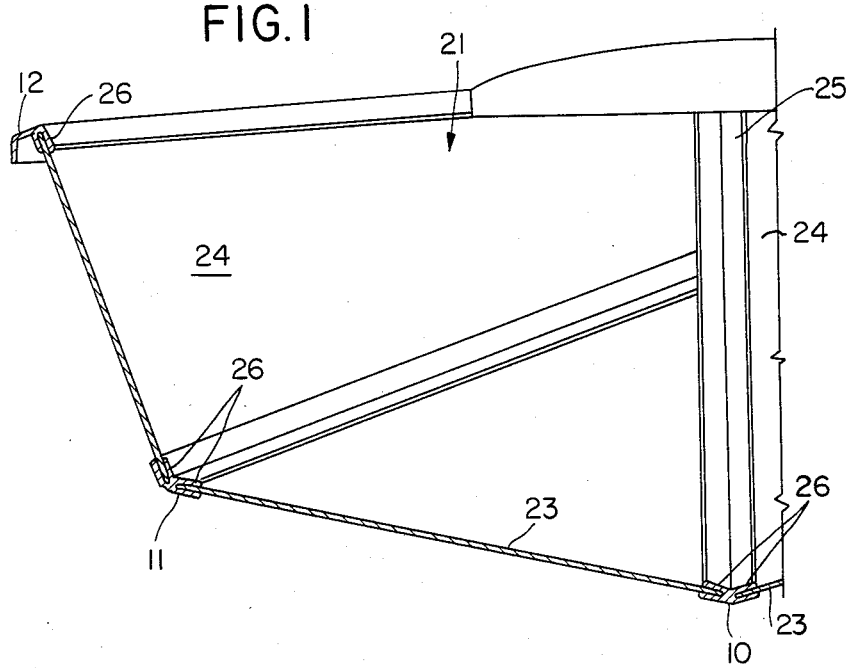
FIG. 1 is a fragmentary diagrammatic cross-section (looking forwardly) of a boat.
Figure 2:
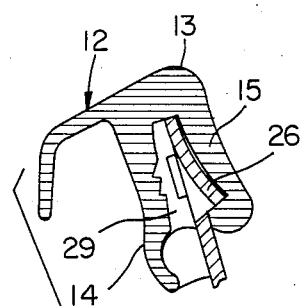
FIG. 2 is an enlarged fragmentary view showing application of the invention to three locations of a boat construction.
Figure 2:
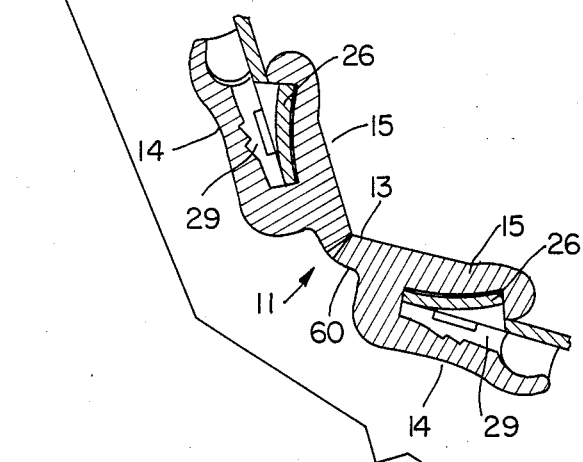
Figure 2:
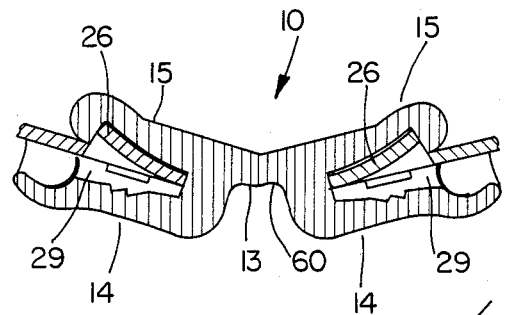
Figure 3:
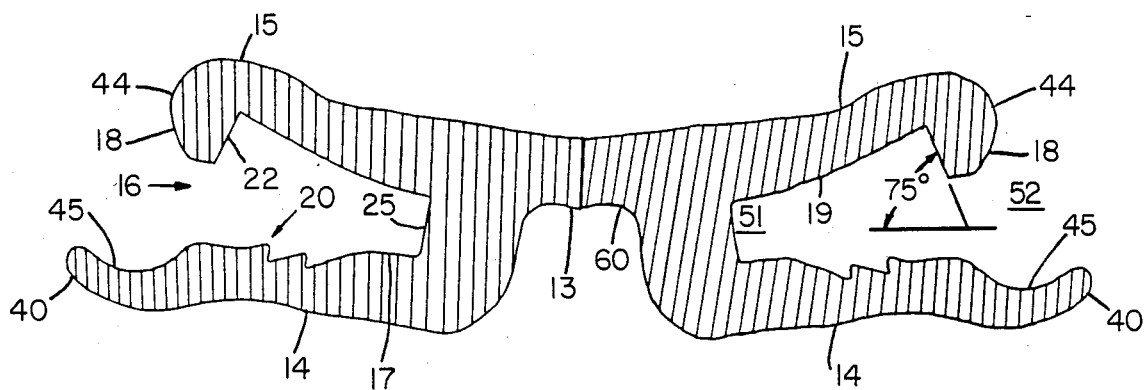
FIG. 3 is an enlarged cross-section of the keel extrusion illustrated in FIGS. 1 and 2.
Figure 4:
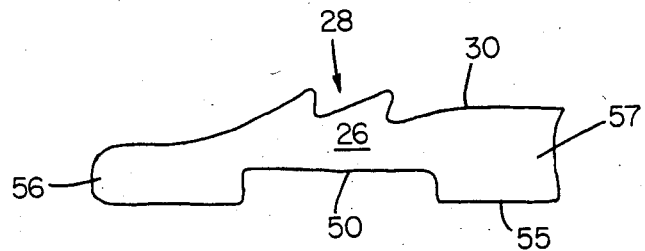
FIG. 4 is an enlarged cross-section of the key illustrated in FIGS. 1 and 2.

In a first embodiment, as shown in FIGS. 1 to 5, each of a keel extrusion joining strip 10, chine extrusion joining strip 11 and gunwhale joining strip 12 is formed to have a base web and at least one pair of a first flange 14 and a second flange 15. Where there are two pairs of flanges 14, 15 (as in the case of the keel extrusion 10 and the chine extrusion 11), the base web 13 is a waisted portion forming a groove 60 which can be readily deformed. Considering the keel extrusion joining strip 10 as shown in FIG. 3 as typical, the inner surfaces of first flange 14 and second flange 15 define a respective slot 16 having a bottom wall 35. The first flange 14 has a first facing surface 17 extending to an outer end 40. The second flange 15 has a second facing surface 19 extending to an end 44. The first flange 14 has a tooth formation 20 spaced from or remote from the outer end 40 and the bottom wall 35 and extending into the slot 16. Preferably the tooth formation 20 comprises a plurality of teeth. The outer end 40 along the first facing surface 17 is concavely curved inwardly toward the slot 16. Alternatively the outer end 40 can be substantially linear and without any curvature. The second flange 15 has a second facing surface 19 with an end 44 which includes an abutment 18. Abutment 18 further includes an angled surface which extends into the slot 16. The angled surface 22 is preferably at an angle of approximately 75° to the horizontal. The first flange 13 has a greater dimensional extent than the second flange 15. In particular when viewed in cross-section as an extrusion the width of the first flange 14 is greater than the width of the second flange 15. Further the slot 16 formed by the first and second flanges 14, 15 has an innermost end 51 which is narrower than an outermost end 52 of the slot 16.

A key 29 (see FIG. 4) is an extruded strip of generally uniform cross-section made from a synthetic material such as PVC. The key has on one surface 30 a tooth formation 28, which preferably comprises a plurality of teeth complementary to the tooth formation 20 on the first flange 14. On another surface 55, opposite the surface 30, a recess 50 is formed in the key. The recess 50 is generally polygonal in cross-section but may also have a curved surface or cross-section. A first end 56 of the key is narrower than a second end 57.

Figure 5:
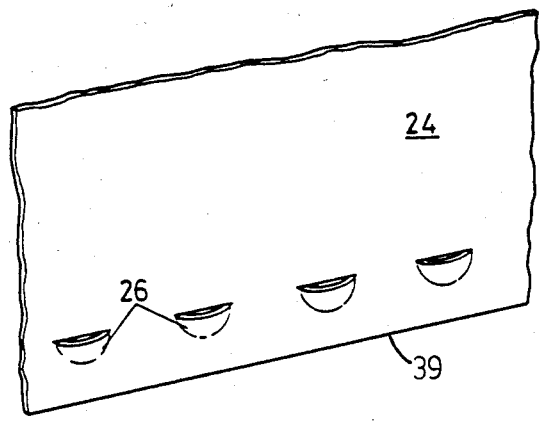
FIG. 5 is a fragmentary perspective view of a sheet illustrating the configurations of the "thumb nail" projections.

A typical panel sheet, such as 24 shown in FIG. 5, is provided with a plurality of lanced "thumb-nail" projections 26 along one edge 39 thereof. The shear edges of the projection are displaced from one face of the sheet and have an angled surface of approximately 75° to the horizontal. The projection 26 form outstanding retaining surfaces which abut surface 22 and the abutment 18 within the respective slots 16. Each sheet of metal when it is joined to the extrusion, e.g. 10, is of compatible alloy composition to avoid electrolytic action when immersed in waters used for boating.

Figure 6:
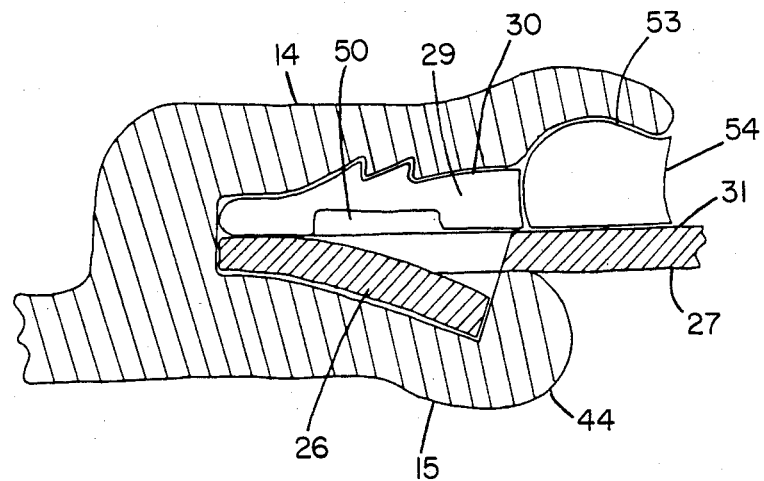
FIG. 6 is an enlarged cross-sectional partial schematic view of the assembly and engagement of the keel extrusion of FIG. 3, the key of FIG. 4 and the sheet of FIG. 5.
Figure 11:
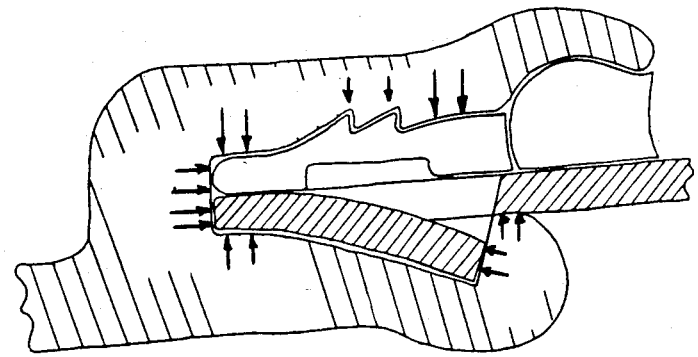
FIG. 11 is a schematic cross-sectional view showing the clamping forces exerted with the assembly.
Figure 7:
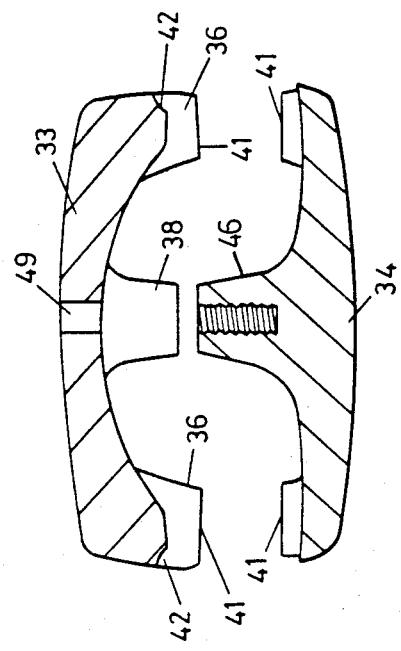
FIG. 7 is a plan view showing an outer clamp of a pair of clamps which are used to clamp the rear end of the keel to the underwater and transom panels of a vessel, FIG. 7 not showing these panels but showing the joining strips which join the panels.
Figure 9:
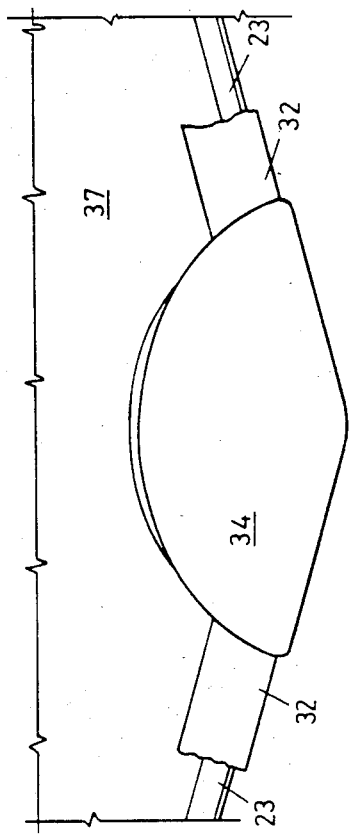
FIG. 9 is an "exploded" section taken on line 9—9 of FIG. 8 and illustrating the configuration of the clamps.
Figure 8:
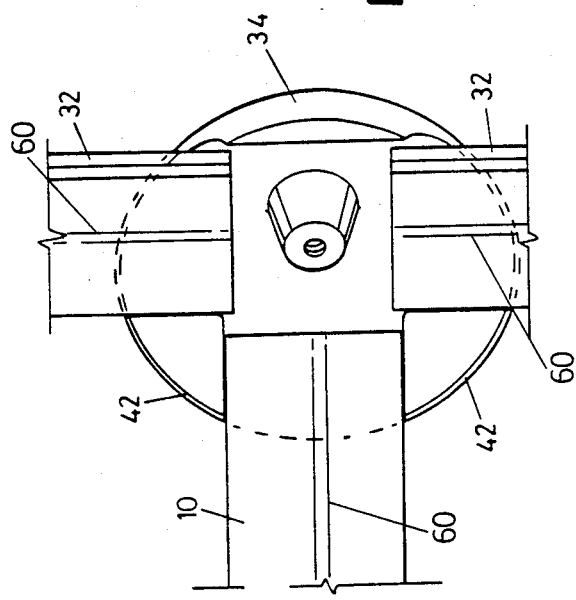
FIG. 8 is a fragmentary longitudinal section showing the inner and outer clamps of that pair of clamps interconnecting the joining strips and panels.
Figure 10:
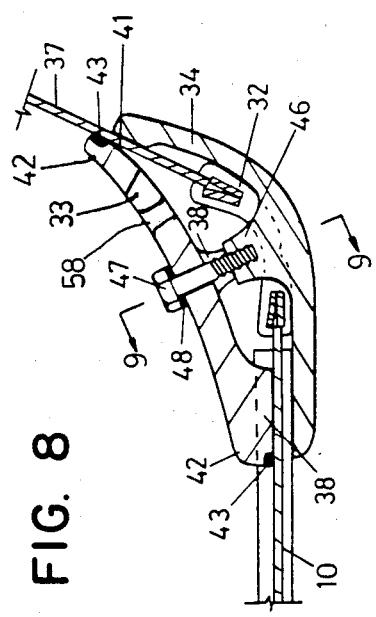
FIG. 10 is a rear end elevation of the assembly.

Reference is made to FIGS. 6 and 11 for the assembly of the panels to the joining strip and the key. The panels are formed with the projections along one edge 39 thereof. The joining strip such as extrusion 10, is extruded to the desired cross-sectional shape and the flanges 14 and 15 on each side of the base web 13 are arranged to subtend the angle necessary for the particular joining strip. The panels are curved to fit into the slots 16 with the projecting retaining surfaces 26 inserted on the same side as flange 15 of each joining strip. The projections are then urged transversely within each of the slots by the insertion of the key 29. The key is inserted so as to engage the tooth formations 20 and 28 of the first flange 14 and key 29, respectively, in complementary relationship. There is more than one row of teeth in the formations 20 and 28 to ensure the integrity of the engagement between the key and the first flange. The recess 50 permits flexibility in the key and insertion of the tooth formation 28 so as to easily engage the tooth formation 20 on the first flange. The innermost first end 56 of the key is narrower than the outermost second end 57 to aid in the assembly and insertion of the key. When inserted the innermost end 56 may abut the slot bottom wall 35. The angled surface 22 of the abutment 18 matches a cooperating angle on the edge of the projection 26. The angled surface 22 of the abutment 18 and matching angled surface of the sheared edges of the projection 26 permits the proper alignment of the projection in the slot 16. In particular the sheet is inserted to cause the edge 36 to abut the bottom 35 of the slot 16. Insertion of the panel projections is facilitated because the outermost end 52 of the slot is wider than the innermost end 51.

After assembly a sealant 54 is applied to the groove 53 formed by the curved surface 45 of the first flange 14 and the face 31 of the sheet. A sealant such as a urethane manufactured by Products Research Corporation, Glendale, Calif. and identified as PRC #365H is suitable. The sealant can be generally described as a "soft setting" composition which is deformable and may be cured, if necessary. A "hard setting" sealant, such as an epoxy, is subject to fracture with impact loads. Sealant fracture may result in fluid leakage. In order to ensure that the sealant should remain intact and effective within the groove, a sufficient volume and dimension of sealant must be applied. In general, the volume and dimension of the sealant used should exceed the amount of sheet movement which may occur during the lifetime of the vessel. The sealant 54 is shown in FIG. 6 is being applied to the face 31. The sealant can also be applied to the face 27 along the abutting interface between the second flange end 44 and the face 27. As shown in FIGS. 3 and 6 the end 40 of the first flange 14 has a concave curvature 45 toward the slot 16 thereby forming the groove 53. Alternatively the end 40 can be without a curvature. The presence of the groove 53 and sealant 54 has a particular advantage in the event of fluid leakage because of sealant failure. Such sealant failure may arise from aging or damage or damage to the assembled structure. The integrity of the sealant and groove can be restored by mechanically deforming the outer end 40 toward the face 31 thereby causing the sealant to act as a gasket. Mechanical deformation can be easily effected by an heavy instrument, such as a hammer. The presence of the curvature 45 is particularly useful to form the sealant as a gasket but a linear end 40 can also effectively form the sealant as a gasket.

The integrity of the assembled joining strip, key and sheet is maintained by clamping forces exerted by the flanges on the key and the projection. After insertion of the panel and alignment of the projection with the angled surface of the abutment, the key is inserted. The insertion of the key tends to urge the flanges apart. In order to provide the maximum clamping forces the flanges should not be stressed beyond their elastic limit. FIG. 11 shows by the illustrated arrows the clamping forces exerted within the assembled joining strip and on and between the joining strip, the key and the projection. The elastic return of the flanges exerts clamping forces (1) between the tooth formations 20 and 28 of the key and the first flange: (2) between the first flange face surface 17 and the key surface 30 and end 56 (3) perhaps between the slot wall 35 and the key end 56: (4) between the slot bottom wall 35 and the sheet edge 39; (5) between the angled abutment surface 22 and the sheared edge of the projection; and (6) between the abutment end 44 and the face 27 of the sheet. The exertion of the clamping forces is necessary to compensate for a fretting action between the sheets and the unavoidable but small movement of the sheets. Unrestricted movement of the sheets can cause, for example, fretting of the sheets; possible separation of the sealant from the sheet, the key or the flanges; dislocation of the key within the slot and generally the failure of the assembled joint. Fretting is an abrasive action which may occur as the sheets move. Aluminum is often used as the metal in the construction of joints and boats. The surface of aluminum is oxidized and aluminum oxide, often used in grinding operations, is abrasive.

In addition, the flanges defining the slot are more capable of surviving an impact load than the sheet being clamped. This ensures that when damage occurs, the sheet will yield and bend before the slot opens, thereby maintaining the integrity of the joint.

In this embodiment all panels are interconnected by joint strips 10, 11 and 12 for the underwater panels, side panels and gunwhales, and by the two transom joining strips 32 (FIGS. 7, 8 and 10), and all corners between adjacent joining strips are interconnected by a respective pair of clamps, each comprising an inner clamp 33 and an outer clamp 34. Since the facing surfaces of the clamps 33 and 34 need to become complementary to the shapes of the joining strips ends and the panels at these locations, each pair or clamping strips will be of slightly different configuration but the configuration illustrated in FIGS. 7 to 10 is illustrative of the requirements for these other locations.

The inner clamp 33 is provided with a pair of downwardly facing flanges 36 which bear against a groove 60 in the base web 13 of the joining strips 32 which join the underwater panel sheets 23 to the transom panel sheet 37. At the same time a central flange 38 bears downwardly in the groove 60 in the base web 13 of the keel joining strip 10. The surfaces designated 41 are panel engaging surfaces, and these surfaces terminate in recesses 42 which contain sealant 43.

The outer clamp 34 is much more rigid than the joining strips 10 or 32 but less rigid than the inner clamp 33. The outer clamp 34 has a centrally located inwardly directed boss 46 which is threadably engaged by a clamp means 47, such as a bolt, which extends through the an aperture 49 in the inner clamp 33 and is sealed with respect thereto by a nylon washer 48. The outer clamp 34 is initially made with more curvature than the required final shape so that when the bolt 47 is tightened, it spreads to bear against the outer surfaces of the joining strips 10 and 32 to initially force the joining strip 32 into clamping condition with the panel edges, and subsequently bears against the outer surfaces of panels 23 and 37 so that these are also clamped. Thus at the location of each corner there exists a double clamping effect which has been found to be effective in inhibiting failure of the joint between the panel and joining strip. In addition an access 58 is provided in the inner clamp 33 to permit a sealant to be applied to the space 59 between the inner and outer clamps.

In FIG. 2 the joining strips are shown with the sealant at the exterior of the vessel. Alternatively the joining strips can be reversed so that the sealant is at the interior of the vessel.

Various modifications in structure and/or function and/or steps may be made to the disclosed embodiments by one skilled in the art without departing from the scope of the invention as defined by the claims.

What is claimed is:

1. A method of construction a vessel, comprising the steps of:
   a. producing a shaped joining strip having first and second facing surfaces defining a slot therebetween, the first surface having a tooth formation, the second surface having an abutment including an angles surface;
   b. deforming a sheet of material near one edge thereof to provide a retaining surface projecting from one face of the sheet;
   c. inserting the deformed edge of the sheet into the slot and locating the retaining surface adjacent the angled abutment surface;
   d. providing a key having a tooth formation on one surface;
   e. inserting the key into the slot to locate the tooth formation of the key and the strip in engaging relationship and also to bear against the other face of the sheet thereby providing engagement of the projection retaining surface and the angled abutment surface; and
   f. clamping ends of the strip and portions of the sheet adjacent those ends with respective pairs of clamps by urging one of each pair into surface-to-surface engagement with inner surfaces of the strip and sheet and the other of each pair into surface-to-surface engagement with outer surfaces of the strip and sheet so as to thereby firmly close and clamp the strip ends against the sheet and the key.

2. A method according to claim 1 wherein:
inserting the retaining surface projection in the slot so as to abut a bottom wall and second surface of the slot and
inserting the key in the slot so as to abut the bottom wall and the first surface of the slot.

3. A method according to claim 1 wherein the first and second surfaces exert a clamping force on the key and the projection.

4. A method according to claim 1 wherein the tooth formation comprises a plurality of teeth.

5. A method according to claim 1 wherein the slot has a bottom wall which exerts a clamping force on the key and the projection.

6. A method according to claim 1 wherein the joining strip is extruded to have a first flange forming the first facing surface, the tooth formation on the first flange being remote from an outer end of the first flange.

7. A method according to claims 1 or 6 wherein the joining strip is extruded to have a second flange forming the second facing surface, the abutment forming an end of the second flange.

8. A method according to claim 6 wherein the outer end of the first flange extends over the key and in confronting relationship with the other face of the sheet to form a groove; and
applying a sealant in the groove.

9. A method according to claim 1 wherein the angle surface is formed at approximately 75°.

10. A method according to claim 1 wherein the joining strip is formed to have first and second flanges forming the first and second facing surfaces, respectively, the first flange being formed to have a greater dimensional extent than the second flange.

11. A method according to claim 1 wherein the joining strip is formed to have a first flange to provide the first surface, the first flange formed to have a curved outer end.

12. A method according to claim 1 wherein the key is formed to have a recess on another surface opposite to tooth formation.

13. A method according to claim 12 wherein the recess is formed to have a polygonal cross-section.

14. A method according to claim 1 wherein the slot is formed to have an innermost end narrower than an outermost end.

15. A method according to claim 1 wherein the abutment bears against the one face sheet surface.

16. A method according to claim 15 wherein a sealant is applied where the abutment bears against the one face sheet surface.

17. A method according to claims 8 or 16 wherein the sealant is a deformable material.

18. A method according to claim 1 wherein the key is formed to have a first end narrower than a second end.

19. A method according to claim 1 further comprising applying a sealant to the sheet and to the key before insertion of the key into the slot, and further applying sealant to the clamps of the pairs of clamps before effecting the surface-to-surface engagement thereof.

20. A method according to claim 19 further comprising applying sealant to the clamps of the pairs of clamps before effecting the surface-to-surface engagement thereof, and injecting a sealant into the slot after insertion of the key and the sheet.

21. A vessel comprising a plurality of sheets and means for interconnecting the sheets comprising:
   a. at least one joining strip having a pair of first and second flanges defining a slot therebetween, the first flange having a tooth formation extending into the slot, the second flange having an abutment including an angled surface extending into the slot;

b. each sheet having a retaining surface projecting from one face of the sheet and disposed in the slot, the retaining surface bearing against the abutment;

c. a key located in the slot, the key having a tooth formation complementary to and engaging the tooth formation of the first flange; and d. clamp means for clamping an end of the strip against the sheet and the key, the clamping means comprising inner and outer clamps, the clamping means urging the inner and outer clamps into surface-to-surface engagement with respective inner and outer surfaces of the joining strip and the sheet.

22. A vessel according to claim 21 wherein the tooth formation comprises a plurality of teeth.

23. A vessel according to claim 21 wherein the tooth formation on the first flange is spaced from an outer end of the first flange.

24. A vessel according to claims 21 or 23 wherein the abutment is at an end of the second flange.

25. A vessel according to claim 23 wherein the outer end of the first flange extends over the key and in confronting relationship with another face of the sheet to form a groove, the groove containing a sealant.

26. A vessel according to claim 25 wherein the sealant is a deformable material.

27. A vessel according to claim 21 wherein the angled surface is at an angle of approximately 75°.

28. A vessel according to claim 21 wherein the first flange has a greater dimenstional extent than the second flange.

29. A vessel according to claim 21 wherein the first flange has a curved outer end.

30. A vessel according to claim 21 wherein the key has a recessed surface opposite the tooth formation.

31. A vessel according to claim 30 wherein the recess has a polygonal cross-section.

32. A vessel according to claim 21 wherein the slot has an innermost end narrower than an outermost end.

33. A vessel according to claim 21 wherein the abutment bears against the one face of the sheet.

34. A vessel according to claim 21 wherein the key has a first end narrower than a second end.

35. A vessel according to claim 21 wherein the outer clamp of each pair of clamps comprises an inwardly directed boss containing a clamp receiving means, and the inner clamp has walls defining an aperture through which the clamp receiving means passes for the clamping of the inner and outer clamps of the pair of clamps.

36. A vessel according to claim 21 wherein the inner surface of the outer clamp of each pair of clamps, and the outer surface of the inner clamp thereof, are both complementary in shape to the shapes of the joining strip and sheet at an end of the joining strip which is clamped by the clamp after resilient deformation of the outer clamp is effected by tightening of the clamping means.

37. A vessel according to claim 21 wherein the inner clamp of each pair of clamps is relatively rigid and has its outer surface complementary in shape to the shape of the joining strip and sheet at an end of the joining strip which is clamped by the clamp, and the outer clamp of the pair of clamps is relatively deformable and its inner surface becomes complementary in shape to the shape of the joining strip only after sufficient tightening of the clamping means to effect closing and clamping of the strip end against the sheet and key.

38. A vessel according to claim 21 wherein the inner clamp includes an access to the space between the inner and outer clamps.

39. An article of manufacture comprising a first strip having first and second surfaces defining a slot therebetween, the first surface having a first tooth formation extending into the slot and spaced from an outer end of the first surface, the outer end being curved toward the slot, the second surface having an abutment including an angled surface extending into the slot, the abutment being at an end of the second surface, a second strip having on one surface thereof a second tooth formation intermediate first and second edges of the second strip and complementary to and engaging with the first tooth formation, and a recess on another surface thereof opposite to the second tooth formation and intermediate the first and second edges, the second strip being disposed in its entirety within the slot whereby the curved outer end extends beyond the edges of the second strip.

40. An article according to claim 39 wherein the first tooth formation comprises a plurality of teeth.

41. An article according to claim 39 wherein the angled surface is at an angle of approximately 75°.

42. An article according to claim 39 wherein the first surface has a greater dimensional extent than the second surface.

43. An article according to claim 39 wherein the slot has an innermost end narrower than an outermost end.

44. An article according to claim 39 wherein the recess has a polygonal cross-section.

45. An article according to claim 39 wherein the first edge is narrower than the second edge.

46. An article according to claim 39 wherein the recess cross-section has a n extent greater than the tooth formation cross-section.

47. An article according to claim 39 wherein a sheet member is disposed between the first and second strip.

* * * * *